United States Patent [19]
Eickemeyer et al.

[11] Patent Number: 5,377,336
[45] Date of Patent: Dec. 27, 1994

[54] IMPROVED METHOD TO PREFETCH LOAD INSTRUCTION DATA

[75] Inventors: Richard J. Eickemeyer, Binghamton; Stamatis Vassiliadis, Vestal, both of N.Y.

[73] Assignee: International Business Machines Corporation, Armonk, N.Y.

[21] Appl. No.: 920,947

[22] Filed: Jul. 28, 1992

Related U.S. Application Data

[63] Continuation-in-part of Ser. No. 687,309, Apr. 18, 1991, Pat. No. 5,287,467.

[51] Int. Cl.5 .............................................. G06F 9/38
[52] U.S. Cl. ..................... 395/375; 364/255.7; 364/263.1; 364/948; 364/955.5; 364/DIG. 1; 364/DIG. 2; 395/400; 395/800
[58] Field of Search ................. 395/375, 400, 800

[56] References Cited
U.S. PATENT DOCUMENTS

| | | | |
|---|---|---|---|
| 4,604,691 | 8/1986 | Akagi | 395/375 |
| 4,984,154 | 1/1991 | Hanatani et al. | 395/375 |
| 5,121,473 | 6/1992 | Hodges | 395/375 |
| 5,142,634 | 8/1992 | Fite et al. | 395/375 |
| 5,210,838 | 5/1993 | Jensen | 395/400 |
| 5,237,666 | 8/1993 | Suzuki et al. | 395/375 |

*Primary Examiner*—Kenneth S. Kim
*Attorney, Agent, or Firm*—Lynn L. Augspurger; Laurence J. Marhoefer

[57] ABSTRACT

Described is a Load Unit for processing the data fetch in load instructions. The Load Unit predicts the address for the data fetch such that the fetch can occur earlier than in the typical load processing. By processing the fetch early, the normal cache access cycle can be eliminated reducing overall execution time. Cache misses can be processed in parallel with other execution thereby reducing the performance degradation of cache misses.

2 Claims, 2 Drawing Sheets

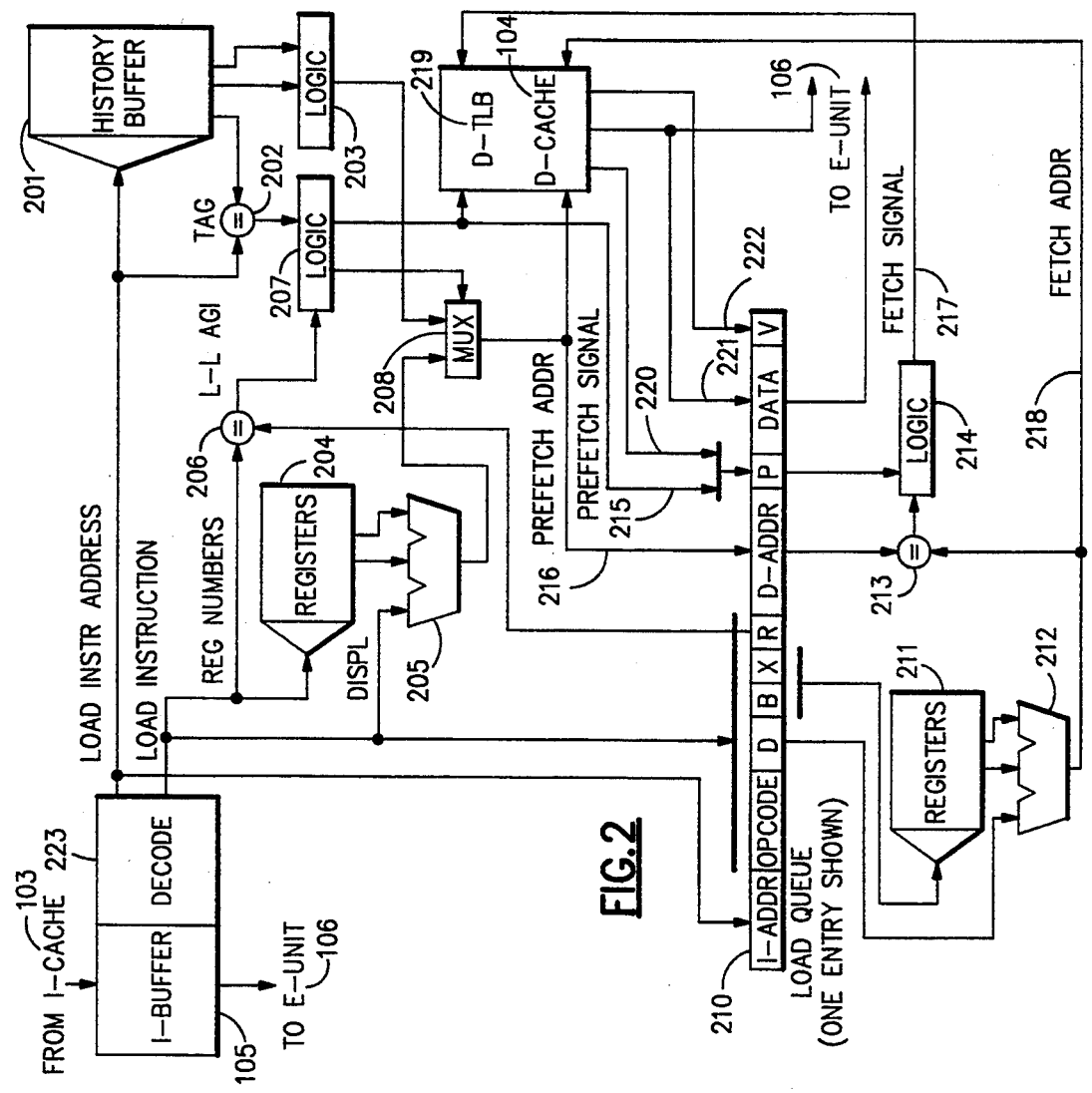
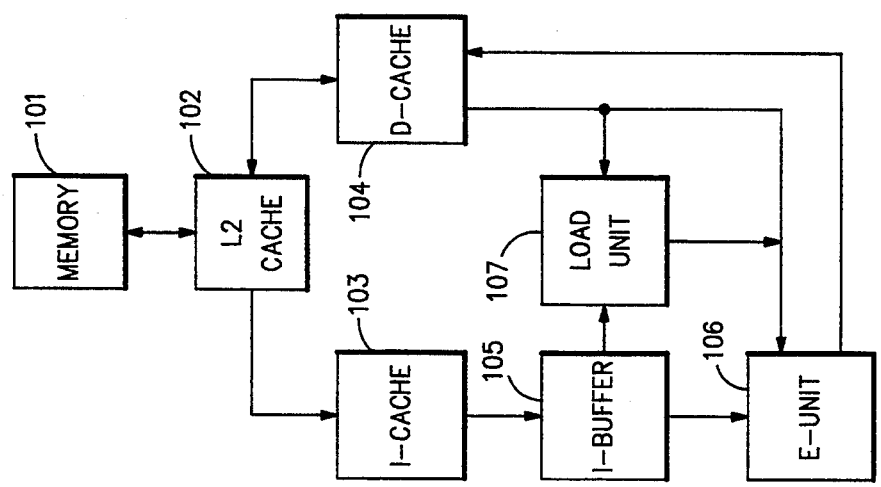

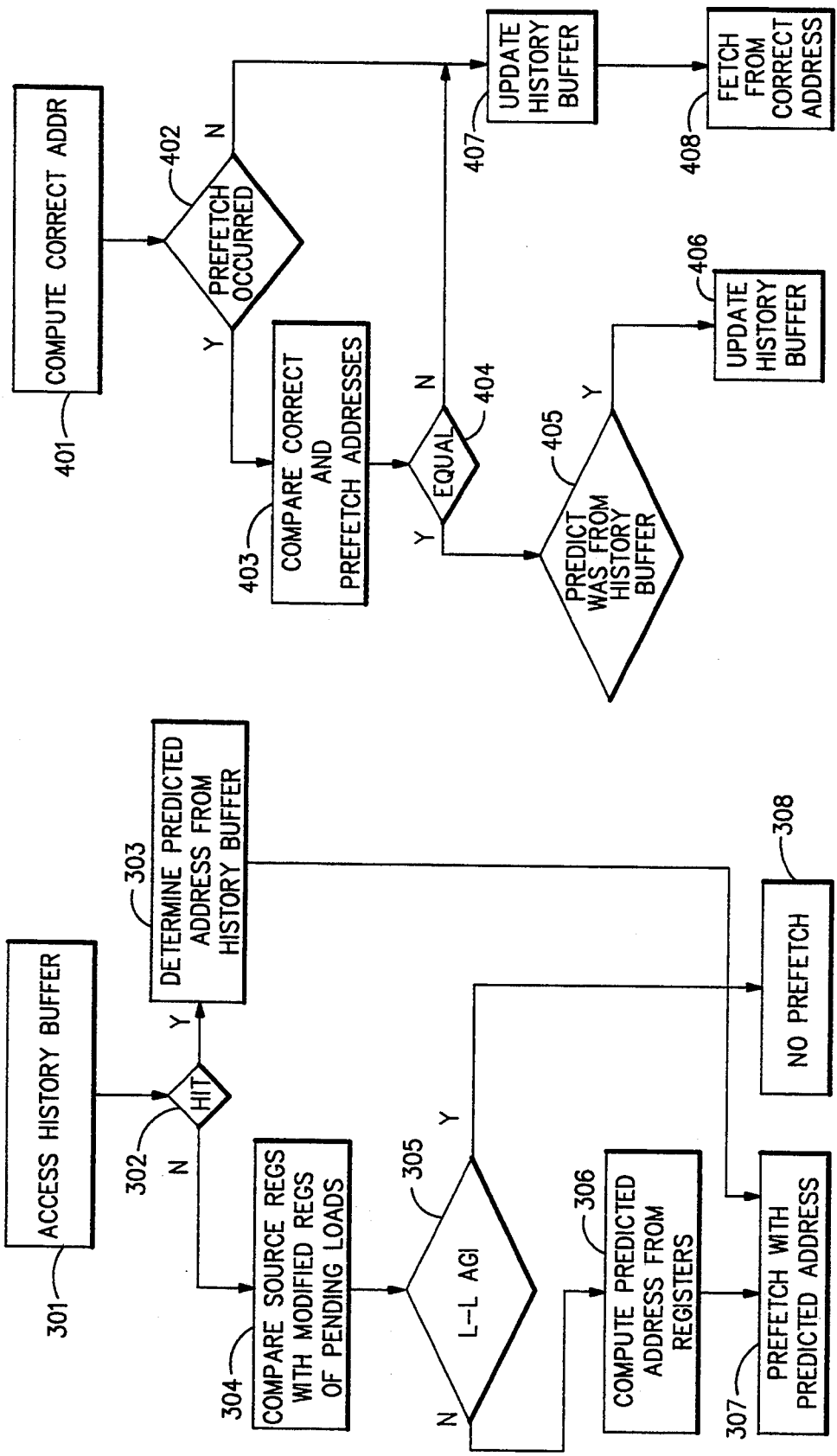

IMPROVED METHOD TO PREFETCH LOAD INSTRUCTION DATA

CROSS REFERENCE TO RELATED APPLICATIONS

This application claims priority from and is a continuation-in-part of the following copending U.S. Patent application:

U.S. patent application Ser. No. 07/687,309 filed Apr. 18, 1991 now issued U.S. Pat. No. 5,287,467, entitled "Pipeline for removing and concurrently executing two or more branch instructions in synchronization with other instructions executing in the execution unit" of Blaner et al.

This application is also related to the following U.S. Patent Application filed concurrently herewith: U.S. patent application Ser. No. 07/920,946 filed Jul. 28, 1992 now U.S. Pat. No. 5,313,634, of Eickemeyer entitled: "Computer System Branch Prediction of Subroutine Returns."

These co-pending applications and the present application are owned by one and the same assignee, International Business Machines Corporation of Armonk, N.Y.

The descriptions set forth in these co-pending applications are hereby incorporated into the present application by this reference.

FIELD OF THE INVENTION

These invention relate to computers and computer systems and particularly to address prediction and data prefetching.

REFERENCES USED IN THE DISCUSSION OF THE INVENTION

During the detailed description which follows the following works will be referenced as an aid for the reader. These additional references are:

1. IBM Corp., Enterprise Systems Architecture/390 Principles of Operation, SA22-7201-0, 1990.
2. P. M. Kogge, *The Architecture of Pipelined Computers*, New York, N.Y.: McGraw-Hill, 1981.
3. A. J. Smith, "Cache Memories," *Computing Surveys*, vol. 14, no. 3, pp. 473-530, September 1982.
4. J. K. Lee and A. J. Smith, "Branch Prediction Strategies and Branch Target Buffer Design." *IEEE Computer*, January 1984.
5. P. Stenstrom, "A Survey of Cache Coherence Schemes for Multiprocessors," *IEEE Computer*, vol. 23, no. 6, pp. 12-24, June 1990.

These additional references are incorporated by reference.

BACKGROUND OF THE INVENTION

As background for our invention consider previous, related patents and publications. There exist several broad categories of prefetching methods. One category of prefetching methods is hardware in the cache controller or storage controller to prefetch cache lines based on the observed cache misses. For example, U.S. Pat. No. 4,807,110, issued February 1989 to Pomerene et al shows a computer system having a cache memory and a main memory. In addition to the regular cache directory, the cache contains an additional directory termed a shadow directory. This shadow directory tracks cache misses and prefetches cache lines according to the reference history by associating a given line with the next line to be accessed. This mechanism prefetches to reduce cache misses but makes no improvements to performance of cache hits. Furthermore, since prediction is based on cache line reference patterns and cache line sizes are typically 128 bytes finer reference patterns are not detected.

IBM Technical Disclosure Bulletin Vol. 34 No. 2, July 1991, pp. 375-376 "Cache Prefetching Scheme with Increased Timeliness and Conditional Prefetches for a Two-Level Cache Structure" by Ignatowski et al describes a prefetch scheme in which a cache miss results in a prefetch of the next sequential line address. While processing the prefetch, the processor may generate a miss on a demand fetch, i.e., not a prefetch. This cancels the prefetch so that the demand fetch can be handled. This technique reduces bus and memory system contention. A prefetched line, when it is actually referenced results in a "pseudo-miss" which initiates another prefetch, as if there had been a miss. This mechanism is located within the storage controller and responds only to cache misses. As before, there is no improvement in the cache hit case and large line sizes mask detailed reference patterns.

IBM Technical Disclosure Bulletin Vol. 34 No. 2, July 1991, pp. 371-372 "Algorithm for Non-Sequential Cache Prefetching" by Ignatowski et al describes a prefetch scheme for non-sequential cache prefetching located in the storage controller. A table is maintained indexed by the address of a cache miss. The table contains the address of the next miss to occur. In this way pairs of related misses are formed. At a later time, when the first of the pair causes a cache miss, the second is prefetched. To be effective, the table size must be much larger than the cache directory. The two misses may be totally unrelated, therefore the subsequent sequence of misses may not be the same. Also, this does not improve the performance of cache hits.

Another broad category of prefetching is to add new instructions specifying when the hardware should prefetch. For example a paper "Software Prefetching" by Callahan et al was published in the Proceedings of the Fourth International Conference on Architectural Support For Programming Languages and Operating Systems in April 1991. New instructions are added to the processor's instruction set. These prefetch instructions behave like load instructions except no data are actually loaded into the processor. The cache directory is checked and if there is a miss, the requested line is prefetched. The implementation of the instruction could be to prefetch as described, or less expensive implementations may choose to ignore the prefetch instruction. Some time after the prefetch instruction is issued, a normal load instruction requests the data transfer, but if the line containing the data had already been loaded into the cache, the cache miss is avoided. This technique requires that the programs run on a computer system must be modified, something that is not always possible to do. The compiler has to insert prefetch instructions into the program, which may not be possible in all instances.

Another broad class of prefetching is instruction prefetching based on branch prediction. There have been many proposed schemes for prefetching instructions. Since instruction access patterns are more regular than data access patterns, prediction-based prefetching of instructions is much more common than prefetching data. For example, U.S. Pat. No. 4,943,908 issued July 1990 to Emma et al and U.S. Pat. No. 4,691,277 issued September 1987 to Kronstadt et al describe means where a table containing branch history is used to prefetch instructions. Branch instructions and instruction prefetching have fundamental differences with Load instructions and data prefetching. For branch prediction, the primary problem is determining if the branch is taken or not; if this is predicted correctly, the address of the next instruction is generally very easy to determine. For Load instructions, there is no conditional action to take into account; however, the address of the data fetch changes frequently. The prefetch of Branch instructions does not modify the processor's registers, but a Load instruction does modify the processor's registers. Therefore, branch prediction and instruction prefetch techniques are generally not applicable to load prediction and data prefetching.

SUMMARY OF THE INVENTION

Our invention deals with the use of a load unit to process instructions that fetch data from storage. The load unit prefetches data from storage by predicting the address of the data.

The improvements which we have made achieve a substantial gain in processor performance. The load unit can access storage using the predicted address earlier than using other techniques, resulting in elimination of one pipeline stage from the normal instruction execution and processing cache misses overlapped with other execution.

These improvements are accomplished by providing a separate unit for processing load instructions which scans instruction text to find the next load instruction, predicts an address from which to fetch data, contains a load queue in which predicted address and prefetched data for pending load instructions (those that have been predicted but not yet verified) are temporarily stored, and performs address verification to determine whether the predicted address is correct.

By identifying load instructions before they would normally have been decoded and prefetching data, the normal data fetch cycle is eliminated from the execution unit pipeline. The data are provided to the execution unit to be further processed or saved in the processor registers. A prefetch that results in a cache miss can be handled early, as well. The cache miss service time is overlapped with execution of other instructions, again reducing the overall program execution time.

The address for the data to be fetched is predicted by a combination of mechanisms. A dynamic history table is searched for a previously saved instance of the load instruction. If there is a hit, the history information determines the predicted address. The address is also computed in the normal fashion; this address is used on a miss of the history mechanism. Since the load instruction is processed early, there is a higher probability that there is a register interlock and the computed address is incorrect. The history mechanism is updated for these cases. A miss indicates a register interlock is not likely.

Register dependencies between a load instructions and other pending load instructions within the load unit are detected. If this is detected and there is a miss in the history mechanism, no prefetch occurs. The invention also allows for other dynamic events to cancel a prefetch, resulting in no prefetch taking place.

These and other improvements are set forth in the following detailed description. For a better understanding of the invention with advantages and features, refer to the description and to the drawings.

BRIEF DESCRIPTION OF THE DRAWINGS

Our detailed description explains the preferred embodiments of our invention, together with advantages and features, by way of example with reference to the following drawings.

FIG. 1 shows schematically an overview of the preferred embodiment and particularly shows a load unit added to a typical computer organization.

FIG. 2 shows a load unit of FIG. 1 in more detail.

FIG. 3 shows a flowchart describing address prediction.

FIG. 4 shows a flowchart describing prediction update.

DETAILED DESCRIPTION OF THE INVENTION

Before considering our preferred embodiments in detail, it may be worthwhile to illustrate, by way of example, the types of problems addressed by this invention.

A computer processor executes a series of instructions. The instructions can usually be divided into a few distinct types, such as arithmetic instructions, instructions that move data from storage into the processor, instructions that move data to storage from the processor, instructions which perform control functions, and instructions which perform multiple functions consisting of combinations of the simpler functions. This invention is concerned with instructions that move data from storage into the processor; they may also perform other functions.

By way of example, consider the IBM ESA/390 instruction set architecture as described in IBM Corp., Enterprise Systems Architecture/390 Principles of Operation, SA22-7201-0, 1990. Examples of several instructions, classified as load instructions in this invention, are described.

L (load): an address is computed by summing the contents of two registers and a constant field; four bytes of data are fetched from storage at the provided address and the data are stored in a processor register, specified by the instruction. This typically requires one cache access.

A (add): an address is computed, as for L, and four bytes are supplied from storage; the data are added to the contents of a processor register and then stored in the register.

LM (load multiple): an address is computed by summing the contents of one register and a constant field; one or more multiples are four bytes are fetched from storage an stored in an equal number of processor registers. This often involves more than one cache access since the number of bytes may exceed the width of the bus from the cache to the processor.

MVC (move character): a first address is computed by summing the contents of one register and a constant field; a second address is computed by summing a different register and a different constant; data are fetched from memory at the first address and stored in memory at the second address; the number of bytes transferred is specified in the instruction. This typically requires one or more cache accesses to fetch data into the processor and one or more cache accesses to store the data. To move all the bytes, multiple fetch-store cycles may be required.

CLC (compare logical character): a first and a second address are computed, as for MVC; data are fetched from both addresses and compared; this instruction completes when the given number of bytes have been fetched, or the fetched bytes from the two addresses differ. This typically requires a fetch from one address, then a fetch from the other address, then a compare operation. This fetch-fetch-compare cycle may be repeated as required.

XC (exclusive-or character): two address are computed, as for MVC; data are fetched from both addresses, the exclusive-or operation is performed, and the result is stored at the first address. This fetch-fetch-operate-store cycle may be repeated as required until all specified bytes are processed.

There are many other instructions that share common characteristics with the example instructions given. The common characteristic is that the first operation of each of these instructions is a fetch from storage. Simple load instructions store the result in a register and complete. Other loads operate on the fetched value, load further data, load and store data, and load data from more than one address. The initial data fetch process is the same in all cases except that for some instructions two registers are added to a constant and in others one register is added to a constant. Most other computer architectures have similar instructions or a subset of these instructions. For example, most RISC processors have one or more forms of simple load instructions but do not have load combination instructions.

A common technique in building a high-performance processor is pipelining, as described in P. M. Kogge, *The Architecture of Pipelined Computers*, New York, N.Y.: McGraw-Hill, 1981. To implement load instructions, pipelining is used. Examples of the implementation of a pipelined load instruction are shown. In the examples, the pipeline consists of the following stages:

Fetch (F): the instruction is fetched from memory.
Decode (D): the instruction is decoded.
Address generation (A): the storage address is computed.
Execution is divided into three types of operations and may require one or more of these types of operations:
Read Data (R): data are fetched from cache.
Write Data (W): data are stored to the cache.
Execute (E): the processor computes, or operates on, some data.
Put-away (P): the processor stores data in a register.

The timing of a simple load instruction, between two simple computation instructions is thus:

```
                      1 1 1
cycle:      1 2 3 4 5 6 7 8 9 0 1 2
I1:         F . . . . . DAEP
I2-L:       F . . . . . DARP
I3:         F . . . . . . . DAEP
```

Instruction I1 executes in cycle 9; Instruction I2 executes in cycle 10: and Instruction I3 executes in Cycle 11. All instructions are shown fetching at the same time because the bus between instruction cache and the processor is typically more than one instruction in width. There may be zero or more cycles between the instruction fetch and decode since multiple instructions are fetched at once and some instruction execution may take many cycles. An instruction buffer holds the fetched instructions until decode. When the load instruction also performs other steps, the processor pipeline may operate as in the following MVC example.

```
                         1 1 1 1 1
cycle:      1 2 3 4 5 6 7 8 9 0 1 2 3 4 5
I1:         F . . . . . DAEP
I2-MVC:     F . . . . . DARWRWP
I3:         F . . . . . . . D . . . A E P
```

In this case the processor performs two reads interspersed with two writes to transfer all the data. The result is the processor instruction execution takes many cycles.

When the load instruction results in a cache miss, indicated by 'r', several cycles are lost; in the example five cycles are lost.

```
                         1 1 1 1 1 1 1 1
cycle:      1 2 3 4 5 6 7 8 9 0 1 2 3 4 5 6 7
I1:         F . . . . . DAEP
I2-L:       F . . . . . DAr r r r r RP
I3:         F . . . . . . . D . . . . . AEP
```

One other issue in load instruction processing is the Address Generation Interlock, or AGI. In the example pipeline, if instruction I1 computes a result for a certain register, and that register is one that is used for computing the address in load instruction I2, the address computation must be delayed until instruction I1 result is available in cycle 10.

```
                      1 1 1 1
cycle:      1 2 3 4 5 6 7 8 9 0 1 2 3
I1:         F . . . . DAEP
I2-L:       F . . . . . . D. ARP
I3:         F . . . . . . . . DAEP
```

Because the number of load instructions is usually a significant fraction of all instructions, any mechanism that improves the performance of load instructions will contribute significantly to overall performance. Three ways to improve the performance are to reduce the penalty of cache misses, to reduce the number of cycles required when there is no cache miss, and two reduce address generation interlocks. This invention describes a solution that reduces the cache miss penalty and shortens the time to process a load with a cache hit.

THE PREFERRED EMBODIMENT

Turning now to our invention in greater detail, it will be seen that FIG. 1 illustrates our preferred embodiment in which a typical computer organization is shown. As requested by the execution unit (E-unit) 106, instructions are fetched into instruction buffer (I-buffer) 105 from instruction cache (I-cache) 103. If there is a miss at I-cache 103, the second-level cache (L2 cache) 102 provides the instructions, or if a miss there, instructions are supplied from memory 101. This handling of caches is typical of most computer systems, as described in A. J. Smith, "Cache Memories," *Computing Surveys*, vol. 14, no. 3, pp. 473-530, September 1982. Instructions are processed by E-unit 106. In a typical computer organization, E-unit moves data to and from the storage system with load and store instructions. For example, a load instruction requests data to be fetched from the data cache (D-cache) 104, or if there is a D-cache miss, from L2 cache 102, or if a miss there, from memory 101. In a store instruction, E-unit 106 sends the data to D-cache 104, and possibly L2 cache 102 and memory 101.

This invention adds Load Unit 107 to the computer organization. The Load Unit 107 detects data fetch instructions from I-buffer 105, predicts the address of the data to be fetched, and processes the fetch from D-cache 104, or L2 cache 102, or memory 101. When E-unit 106 performs the fetch, the data are supplied directly from Load Unit 107 in most cases. In some other cases, when the Load Unit prediction is incorrect, E-unit 106 fetches from D-cache 104, etc. The operation of a store instruction is unchanged, and consists of a transfer from E-unit 106 to D-cache 104, etc.

FIG. 2 shows a detailed description of Load Unit 107. A load instruction, detected in I-buffer 105, and the address of the instruction are used by Load Unit. The detection of load instructions is by decoding or partial decoding of instruction opcodes in a decode unit 223 enough to identify the load instructions and setup the controls necessary to process the instruction. The control paths are not shown in the figure, for clarity, but consist of the usual controls for pipeline latches and multiplexors present in a pipelined processor.

Once a load instruction is identified, the address for the data fetch is determined by a combination of normal address generation, history-based prediction, and dependency detection. FIG. 3 is a flowchart of how the address is determined. The history buffer 201 is searched using the load instruction address for a match. The history buffer is organized as a typical cache or branch target buffer directory, described in more detail in J. K. Lee and A. J. Smith, "Branch Prediction Strategies and Branch Target Buffer Design," *IEEE Computer*, January 1984. One or more tags are read from history buffer 201 and compared instruction address in comparator 202. If there is a match, a target address is read from history buffer, processed by logic box 203 and transmitted to multiplexor 208. This sequence is described by process box 301, decision box 302, and process box 303 of FIG. 3.

An example of a specific history buffer is delta prediction. The history buffer 201 is searched using the load instruction address. On a match, the entry found contains the last address loaded by this instruction and zero or more delta values indicating the data fetch address history for this instruction. Logic box 203 interprets the state of the entry and performs an addition of a delta and the previous address to obtain the predicted address. If there are no delta values in the implementation, the prediction is the same address used previously.

As the history buffer is predicting an address, a normal address generation occurs consisting of reading register file 204 and adding these values with displacement field from the instruction in an adder 205. (Architectures other than IBM ESA/390 may compute an address differently or with fewer or more operands.) The output of adder 205 is also transmitted to multiplexor 208. This process is described in FIG. 3 in process box 306.

In addition, the registers read by the load instruction are compared to the modified registers in other pending load instructions, using comparator 206. A pending load instruction is one in which the data address has been predicted, but the prediction has not yet been verified. Pending loads are stored in Load Queue 210. If comparator 206 determines that there is a pending load instruction that modifies a register used by the subject load instruction, the address generation from adder 205 will not be used. This condition is termed a load-load address generation interlock (L-L AGI). Since a pending load has not yet modified any registers, the value in the register needed by the subject load does not yet have the correct value. Any address generated from this register will be incorrect. Logic box 207 selects the address used for the data fetch by controlling multiplexor 208 and generating the prefetch control signal 215. The multiplexor output is the prefetch address 216. This process is described in flowchart box 304. The decision box 305 detects the L-L AGI resulting in no prefetch 308 or the use of computed address 306 to be used for the prefetch 307.

If logic box 207 determines that a prefetch is to be made, prefetch signal 215 activates the storage subsystem, pad of which is shown in FIG. 2: the data translation lookaside buffer (D-TLB) 219 and D-cache 104. The address from which to prefetch is transmitted on prefetch address lines 216. The prefetch consists of checking some or all of D-TLB, D-cache, and L2 cache directories to locate the data. A miss in one of these directories optionally may result in cancelling the prefetch. This design choice is dictated primarily by performance considerations. A typical choice is to cancel a prefetch that is a D-TLB miss but to process a prefetch that is a D-cache miss or L2 cache miss. If the prefetch is cancelled, this information is transmitted to Load Unit on signal line 220. When the data are received from the memory system, a valid line 222 indicates the completion of the operation and indicates that line 221 contains the data.

The load instruction is stored in Load Queue 210. The Load Queue may consist of one or more entries, the number of entries determined by performance and cost trade-offs. A Load Queue entry includes the instruction address, instruction itself (opcode, displacement, and register fields B, X, and R), a prefetch indicator (P) and the data received from the memory system. Prefetch indicator is set from prefetch signal 215, or prefetch cancel signal 220. The prefetch indicator specifies whether any prefetch was made, or subsequently cancelled, and the source of the prefetch address, either the history buffer or address generation. The load queue also contains the data received on data lines 221 and the valid data indicator received on valid line 222. The load instruction remains in the Load Queue until the prefetch can be verified.

While the Load Unit is processing load instructions, E-unit 106 processes non-load instructions and load instructions that also perform computations on the fetched data, fetch more than one block of data, or both fetch and store data. When a load instruction does only a simple data fetch, the operation is performed entirely in Load Unit, but the Load Unit verification process is synchronized with the E-unit. When a load instruction does more than a simple data fetch, the first fetch is performed in Load Unit and the remaining fetches, stores, or computations are performed in E-unit. Typically E-unit is pipelined. When the pipeline stage for address generation is reached, the Load Unit initiates the prediction verification process. The E-unit must track the presence of a load in Load Unit. This is done by the E-unit identifying the load instruction from the I-buffer and saving information about the instruction. If the load is more than a simple data fetch, the instruction is processed much like any non-load instruction, with the exception of the load prediction verification. For a simple load instruction, E-unit does not process the load instruction. The information saved by the E-unit about a load instruction consists of a bit identifying the presence of the load instruction. The destination identifier for the data prefetch may also be included, although the Load Queue also contains this information. This load identification information moves along the E-unit pipeline and generates a signal to the the Load Queue at the appropriate time to start the verification process and to transfer the prefetched data from the Load Queue to E-unit for further processing or storing in a register.

FIG. 2 further shows the prediction verification process. FIG. 4 is a flowchart describing the verification process and the updating of the history buffer. When the E-unit signals Load Unit that a pending load instruction can now be verified, the load instruction data address is computed by reading from register file 211 and performing address generation with adder 212. The register file 204 and register file 211 may be the same physical register file, or one may be a copy of the other. Adder 212 and adder 205 are typically separate hardware units, although for some loss of performance, they can be combined into one unit. The output of the adder 212 is the fetch address 218. The previously predicted address is read from Load Queue 210 and compared to fetch address 218 in comparator 213. Logic 214 determines if the prediction was correct. If there was a prefetch, as indicated by prefetch bit (P) and the prefetch address and fetch address match, the prefetch was correct. In any other case, the prefetch was incorrect. The incorrect prediction is signalled with fetch signal 217 to the memory system in order to fetch from the correct address. FIG. 4 boxes 401, 402, 403, and 404 describe the verification process.

If the prefetch address was determined from the history buffer, as indicated by the prefetch indicator (P), and shown in decision box 405, then the history buffer may need to be updated, box 406. If no prefetch occurred, decision box 402, or the prediction was incorrect, decision box 404, the history buffer is updated, box 407, and the correct fetch is performed, box 408. The correct fetch is transmitted to memory system, D-TLB 219 and D-cache 104. When the data are received from line 221 the data are transmitted to E-unit 106 for storing in a register or for further computation. If logic box 214 determines the prediction was correct, the prefetched data are transmitted directly from Load Queue 210 to E-unit 106 without further memory system actions. This correct prediction has successfully processed the data fetch early. The E-unit does not require a separate fetch cycle, thus performance is improved.

The history buffer update process consists of creating a new entry if the prediction initially resulted in a miss, or updating an existing entry if the prefetch address was predicted using the history buffer. For a delta prefetch history buffer, the correct data address is recorded, the delta from the last data address is computed, and the saved delta(s) are updated.

The pipeline operation of a processor with the Load Unit invention can now be illustrated. The additional types of pipeline stages in these examples are Address prediction (I): the prefetch address is determined.

Prefetch data (T): the target data are fetched.

Load test (L): the prefetch address is verified.

The operation of load instructions is shown on two lines in the examples. The first example is a simple load surrounded by simple computation instructions, where the load prefetch was correct.

```
                         1 1
cycle:      1 2 3 4 5 6 7 8 9 0 1
I1:         F . . . . . DAEP
I2-L:     / F I T . . . . . L          load unit
          . . . . . . . . . P          E-unit
I3:         F . . . . . . DAEP
```

The prefetch occurs in cycle 3 and the address is verified in cycle 9. The Load-Unit saves one cycle as instruction I1 executes in cycle 9 and instruction I2 executes in cycle 10.

The next example shows an incorrect prefetch address.

```
                         1 1 1
cycle:      1 2 3 4 5 6 7 8 9 0 1 2
I1:         F . . . . . DAEP
I2-L:     / F I T . . . . . L R        load unit
          . . . . . . . . . P          E-unit
I3:         F . . . . . . D . AEP
```

The correct data are fetched in cycle 10. In this case, there are no cycles saved, but no cycles are lost, either.

The next two examples show the operation of a more complex load instruction, MVC for a correct prediction of the first fetch and an incorrect prediction.

```
                         1 1 1 1 1
cycle:      1 2 3 4 5 6 7 8 9 0 1 2 3 4
I1:         F . . . . . DAEP
I2-MVC:    /F I T . . . . . L          load unit
          . . . . . . . DAWRWP         E-unit
I3:         F . . . . . . . D . . AEP
```

The unit prefetches the source data and transfers the data to the E-unit. The E-unit computes the address of the destination data and performs stores and subsequent loads. The Load Unit saves one cycle from the total execution time on the correct prediction.

```
                         1 1 1 1 1 1
cycle:      1 2 3 4 5 6 7 8 9 0 1 2 3 4 5
I1:         F . . . . . DAEP
I2-MVC:    /F I T . . . . . L R        load unit
          . . . . . . . DA . WRWP      E-unit
I3:         F . . . . . . . D . . . AEP
```

On the incorrect prefetch, the Load Unit fetches from the correct address and sends the data to E-unit. No cycles are lost due to the incorrect prediction.

The next example shows the timing on a correct prediction when there is a five cycle cache miss.

```
                         1 1
cycle:      1 2 3 4 5 6 7 8 9 0 1
I1:         F . . . . . DAEP
I2-L:     / F I r r r r r TL           load unit
          . . . . . . . . . P          E-unit
I3:         F . . . . . . DAEP
```

The cache miss is handled by the Load Unit and is completely overlapped due to the early detection of the load instruction. A total of six cycles are saved compared to a processor without the load unit. Five cycles are saved by overlapping the cache miss and one cycle is saved by processing the load in the Load Unit. When an incorrect prefetch causes a cache miss extra cycles are required as shown in the example.

```
                1 1 1 1 1 1 1 1
cycle:    1 2 3 4 5 6 7 8 9 0 1 2 3 4 5 6 7
I1:       F . . . . . D A E P
I2-L: /   F I r r r r r T L R            load unit
          . . . . . . . . . . P          E-unit
I3:       F . . . . . . D. A E P
```

The incorrect cache miss causes no delay as it is completely overlapped. If the cache miss service time is longer than the five cycles in the examples, not all the cache miss can be overlapped. For the correct prediction, those cycles overlapped result in a performance increase. For an incorrect prediction, some cycles are lost. However, cache misses and incorrect predictions are occur much less frequently than cache hits and correct predictions. Therefore there is a net performance gain from prefetching.

There are several issue that must be addressed in the implementation of the load unit to keep architectural consistency and good performance. Typical high-performance processors have a store queue (also called a write buffer). Store instructions create a store queue entry and the stores are reflected in the cache whenever cache cycles are available. This reduces cache contention between reads and writes. In addition, the store queue helps maintain the required appearance of sequential instruction execution even when instructions are actually executed out-of-order. Two issues arise when there is both a store queue and a load queue. A load prefetch address may also be contained in the store queue because a previous store instruction generated the store data but the data has not yet been transferred to the cache. Therefore, all load prefetches must search the store queue for matches. The other case is a store to an address that is already in the load queue. Therefore, all stores must search the load queue for matches. In both cases, the correct value for the prefetch is in the store queue and may not yet be in the cache. There are several solutions to these issues. First, the architecture may specify that the store data cannot be passed to the load unit. In IBM ESA/390, for example, in a multiprocessor configuration all processors must observe the store at the same time. Therefore, the Load Unit cannot obtain the data from the store queue until the store queue releases the data to the storage system. When the store is to the same address in a load queue entry, the load queue entry can be marked as no prefetch. The fetch will occur again and use the standard rules for this situation. When the load is from a store queue entry, no prediction could be indicated, or the load prefetch could be delayed until it is allowed to continue when the store queue completes its actions. In other cases, the architecture may allow the load prefetch to use the data from the store queue or the store may update the load queue entry.

In many architectures there are some instructions that serialize execution. This typically means that all preceding instructions must complete before succeeding instructions. The simple implementation is to flush all prefetch buffers (instruction buffer, load queue, and any others, such as a branch queue). The instructions after the serializing instruction are then fetched again and reissued as in normal processing. The load unit processes them again with the normal prediction, prefetch and enqueue operations. More complex solutions are to detect which entries have to be flushed and which can remain.

Another area of concern with prefetching is that a correct prefetch could occur before the fetch for an instruction that prefetched incorrectly. That is, the correct fetches were performed out-of-order. This is a concern in a multiprocessor configuration in that incorrect behavior could result if another processor is storing to the same addresses but prediction results in a different access order. The fetches must appear to be in-order from the perspective of another processor. This is important only if the other processor stores to the address of one of the fetches. For caches, there are a variety of algorithms to maintain the consistency of data. See for example P. Stenstrom, "A Survey of Cache Coherence Schemes for Multiprocessors," *IEEE Computer*, vol. 23, no. 6, pp. 12–24, June 1990. This must be extended to the load queue in some form. The straightforward solution is for the load queue to observe stores from other processors. This may create a large amount of traffic for load queue checking. In caches, a duplicate directory is often maintained for this reason. A duplicate of the load queue (data real addresses only) can be maintained by the cache. To avoid excessive coordination between the cache and load queue, the load queue does not signal the cache when an entry is removed from the load queue. Whenever the cache detects a store matching a cache load queue entry, it can either signal the load to change all entries to no prefetch, or it can send the address to the load queue for it to check for an exact match. This cache copy of the load queue over indicates stores, but it filters out most stores to reduce traffic to the load queue.

Since the load prefetch adds another requestor for cache services, in addition to normal loads and the store queue, there are performance issues to consider. An additional cache port for prefetching reduces many performance concerns. This may be an unnecessary expense, however. As long as the cache utilization is low enough, the extra traffic for prefetching may not be significant. A correct prefetch does not increase the cache bandwidth requirements; it only shifts the time of the fetch. For those load instructions where no prefetch is made, there is no requirement for additional bandwidth. Incorrect prefetches do create more bandwidth requirements to the cache, but this applies to a small fraction of all prefetches hence imposes a small increase in the cache workload.

On a typical sequential machine, when there is a cache miss, all instructions must wait. When loads can be processed out-of-order it is beneficial to allow loads to access the cache while a cache miss from an earlier instruction is in progress. As long as the subsequent cache access is a hit, it can be processed. If it is a miss it must wait until the first miss is completed. The load unit accesses the cache when it can find available cache cycles. If there are none available, the prefetch will be delayed until it is in sequential order. When a cache miss blocks all other cache access, this may happen enough times to make prefetch less useful. If this is the case, a cache that allows other accesses during a miss will result in much better performance. If there is a miss on a prefetch, this would lock out correct fetches unless the cache could respond while the miss is in progress.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. In a computer system in which instructions are stored in an instruction memory and transferred from said instruction memory to an execution unit for execution by said execution unit, a method for prefetching data for a load instruction before said load instruction is transferred to said execution unit, comprising the steps of:

detecting a load instruction in said instruction memory prior to transfer of said load instruction to said execution unit;

searching a load instruction history store for a match between a load instruction detected in said detecting step and a load instruction in said load instruction history store;

if there is a match in said searching a load instruction history store step:

determining a predicted address for data to be fetched by said load instruction detected in said detecting step from historic data in said load instruction history store;

prefetching data at the predicted address determined in said just previous determining step;

storing in a load unit memory the load unit instruction detected in said detecting step and its prefetched data determined in said just previous prefetching step;

if there is no match in said searching a load history store step:

determining whether or not data stored in register locations that would be used in calculating a predicted address for data to be fetched by said load instruction detected in said detecting step will change as a result of executing a pending load instruction;

if data stored in said register locations will change, aborting the prefetch operation for said load instruction detected in said detecting step;

if data stored in said register locations will not change, calculating a predicted address for data for said load instruction detected in said detecting step on the basis of data stored in said register locations;

prefetching data at the predicted address determined in said just previous calculating step;

storing in a load unit memory the load instruction detected in said detecting step and its prefetched data fetched in said just previous prefetching step; and verifying a predicted address of a load instruction stored in said load unit memory prior to execution of said load instruction.

2. In a computer system in which instructions are stored in an instruction memory and transferred from said instruction memory to an execution unit for execution by said execution unit, apparatus for prefetching data for a load instruction before said load instruction is transferred to said execution unit, comprising in combination:

means for detecting said load instruction in said instruction memory prior to transfer of said load instruction to said execution unit;

means for searching a load instruction history store for a match between said load instruction detected by said means for detecting and a load instruction in said load instruction history store;

means for determining a predicted address for data to be fetched by said load instruction from historic data in said load instruction history store when said means for searching detects said match;

means for prefetching data at the predicted address determined by said means for determining a predicted address;

means for storing in a load unit memory said load unit instruction and its prefetched data;

means for determining whether or not data stored in register locations that would be used in calculating a predicted address for data to be fetched by said load instruction will change as a result of executing a pending load instruction when said means for searching does not detect a match;

if data stored in said register locations will change, means for aborting the prefetch operation for said load instruction;

if data stored in said register locations will not change, means for calculating a predicted address for data for said load instruction on the basis of data stored in said register locations;

means for prefetching data at the predicted address;

means for storing in said load unit memory said load instruction and its prefetched data; and means for verifying a predicted address of said load instruction stored in said load unit memory prior to execution of said load instruction.

* * * * *